(12) United States Patent
Grant et al.

(10) Patent No.: US 7,069,273 B2
(45) Date of Patent: Jun. 27, 2006

(54) SYSTEM AND METHOD FOR DETERMINING PACKAGING REQUIREMENTS FOR A PART

(75) Inventors: John E. Grant, Morton, IL (US); William T. Akright, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 551 days.

(21) Appl. No.: 10/321,419

(22) Filed: Dec. 16, 2002

(65) Prior Publication Data

US 2003/0130753 A1 Jul. 10, 2003

Related U.S. Application Data

(60) Provisional application No. 60/343,352, filed on Dec. 21, 2001.

(51) Int. Cl.
*G06F 17/00* (2006.01)

(52) U.S. Cl. .................................. 707/104.1

(58) Field of Classification Search .............. 707/1, 707/10, 100, 102, 104.1; 705/1, 28, 29, 50–53, 705/57, 80; 345/418, 440, 581, 589, 600–602; 700/90, 95–97, 103, 117; 703/1
See application file for complete search history.

(56) References Cited

U.S. PATENT DOCUMENTS

| | | | | |
|---|---|---|---|---|
| 5,257,369 A | * | 10/1993 | Skeen et al. | 709/229 |
| 6,128,887 A | | 10/2000 | Suokas et al. | 53/446 |
| 6,152,839 A | * | 11/2000 | Heyduk | 473/562 |
| 6,256,549 B1 | | 7/2001 | Romero et al. | 700/121 |
| 6,311,186 B1 | * | 10/2001 | MeLampy et al. | 707/10 |
| 6,381,585 B1 | * | 4/2002 | Maples et al. | 705/36 R |
| 6,397,163 B1 | * | 5/2002 | Hoyt et al. | 702/136 |
| 6,484,182 B1 | * | 11/2002 | Dunphy et al. | 707/3 |
| 6,742,001 B1 | * | 5/2004 | Ripley | 707/104.1 |
| 6,882,892 B1 | * | 4/2005 | Farrah et al. | 700/97 |
| 6,915,274 B1 | * | 7/2005 | Abhyanker | 705/26 |
| 2002/0087440 A1 | * | 7/2002 | Blair et al. | |
| 2002/0178029 A1 | * | 11/2002 | Nutter et al. | |

* cited by examiner

*Primary Examiner*—Greta Robinson
*Assistant Examiner*—Harold E. Dodds, Jr.
(74) *Attorney, Agent, or Firm*—Finnegan, Henderson, Farabow, Garrett & Dunner LLP (57) ABSTRACT

A computer based system and method determines packaging for a part. The system and method allow a user to establish a set of part characteristics and generates the packaging specification as a function thereof. Additionally the system and method uses packaging materials and packaging methods stored in a database and allows the association of one or more of the packaging materials and packaging methods to a part to create the packaging specification.

72 Claims, 9 Drawing Sheets

CATERPILLAR     Packing Work Order     File Type : PRODUCTION

Supplier Code : C2410S0 - FONTANA LUIGI SPA

Part Number : 1A-1135     COO: L     Description : BOLT

| | | | | |
|---|---|---|---|---|
| Net Wgt: 0.240 | Shelf Wgt : 12.157 | Class : A | Traffic: | Load (s) : |
| Part Length 3.900 | Shelf Length 6.300 | Eng Chg : | 0 Rcpt Date: | Temp Loc: |
| Part Width : 3.900 | Shelf Width : 6.300 | Eng Date : | Rcpt Qty: | P.O. #: |
| Part Height : 3.900 | Shelf Height : 4.500 | RN : | 0 Ereal Qty: | Return No: |
| Date : 12/Jun/2001 | Time : 14:44:20 | Status : 01 | | Case No: |

Ship to Peoria Production
Packaged/Processed by Receiving Facility

Label: Made in ITALY

Receiving Facility Methods

LEVEL-1 UNIT CONTAINMENT     Package Quantity:50     UOM: PC

Material 1:     1     21     Corrugated Carton

Shelf: Wgt 12.157     L: 6.300     W: 6.300     H: 4500     Cube/Sq In: 178.605

Label 1:     1 6007     #6007/6026 ID Label Per Lbl Program     Place at Label Locator Marks     Top Close 1:     8004 2" Clear Tape     Tape Carton Ends

LEVEL-7 TRANSPORT

Material 1:     63A Carton w/#1 (9003) Pallet
        Total Pieces: 4150     Total Packages: 83

LMS

| FACILITY: | STORE TYPE: | CPTQTY: | CTRQTY: |
|---|---|---|---|
| MEL (26): | | 0 | 0 |
| SNG (85): | | 58 | 0 |
| MOR (47): | # 63A CARTON W/# 9003 41"X29" PALLET. | 1.15 | 3000 |

[ << ] [ >> ] [ Print PWO ] [ Cancel ] [ Image ]

SYSTEM AND METHOD FOR DETERMINING PACKAGING REQUIREMENTS FOR A PART

This application claims the benefit of prior provisional patent application Ser. No. 60/343,352 Filed Dec. 21, 2001.

TECHNICAL FILED

The present invention relates generally the packaging of parts, and more particularly, to a computer based system and method for generating a packaging specification based on characteristics of the part.

BACKGROUND

Packaging requirements or specifications may be used to detail how items are to be packaged for shipping. The items could be of any type, e.g., engines engine replacement parts, nuts, bolts, assemblies, anything that needs to be shipped.

Typically, packaging specifications are created manually. For each type of shipment, which may include an item characteristics (weight, number, etc. . . . ) and packaging parameters (number of parts, destination, method of shipping), the packaging specifications may be assembled into a packaging work order (PWO), based on packaging data known by the person preparing the PWO or gathered from many, various sources, i.e., computer databases and/or paper references. Known processes and methods are inefficient and time-consuming.

The present invention is aimed at one or more of the problems discussed above.

SUMMARY OF THE INVENTION

In a first aspect of the present invention, a computer based system for determining packaging for a part is provided. The system includes a database for storing package specification data and a processing unit coupled to the database. The processing unit is adapted to establish a set of part characteristics and to determine a packaging specification.

In a second aspect of the present invention, a method for determining packaging for a part is provided. The method includes the steps of establishing a set of part characteristics and determining a packaging specification for the part as a function of the part characteristics and a package specification database.

In a third aspect of the present invention, a computer based system for determining packaging for a part is provided. The system includes a database for storing a plurality of packaging materials and a plurality of packaging methods and a processing unit coupled to the database. The processing unit is adapted to establish a set of part characteristics related to the part, associate at least one packaging material from the database with the part, and associate at least one packaging method from the database with the part, and to define a packaging specification.

In a fourth aspect of the present invention, a method for preparing packaging for a part is provided. The method includes the steps of storing a plurality of packaging materials in a database, storing a plurality of packaging methods in the database, and establishing a set of part characteristics related to the part. The method further includes the steps of associating at least one packaging material from the database with the part, associating at least one packaging method from the database with the part, and defining a packaging specification for the part as a function.

In a fifth aspect of the present invention, a computer program product for determining packaging for a part is provided. The computer program product includes computer readable program code means for establishing a set of part characteristics and computer readable program code means for determining a packaging specification for the part as a function of the part characteristics and a package specification database.

In a sixth aspect of the present invention, a computer program product for preparing packaging for a part is provided. The computer program product includes computer readable program code means for storing a plurality of packaging materials in a database, computer readable program code means for storing a plurality of packaging methods in the database, and computer readable program code means for establishing a set of part characteristics related to the part. The computer program product further includes computer readable program code means for associating at least one packaging material from the database with the part, computer readable program code means for associating at least one packaging method from the database with the part, and computer readable program code means for defining a packaging specification for the part as a function of the part characteristics, the at least one packaging material, and the at least one packaging method.

DETAILED DESCRIPTION

With reference to the drawings, and in operation, the present invention provides a computer based system 100 and a method 200, 500 of determining packaging recommendations for a part. In a first embodiment, the packaging recommendations are packaging requirements. The packaging requirements or recommendations may by embodied in a packaging work order or "PWO".

In one embodiment of the present invention, a user 110 may establish information related to the part to be shipped and the system 100 and method 500 generate the packaging recommendations. In a second embodiment of the present invention, the components of packaging work orders may be stored in a database 102 and the system 100 and method 500 allow the user 110 to define the PWO for a part or group of parts be assigning different components to the part (see below).

Figure 1:
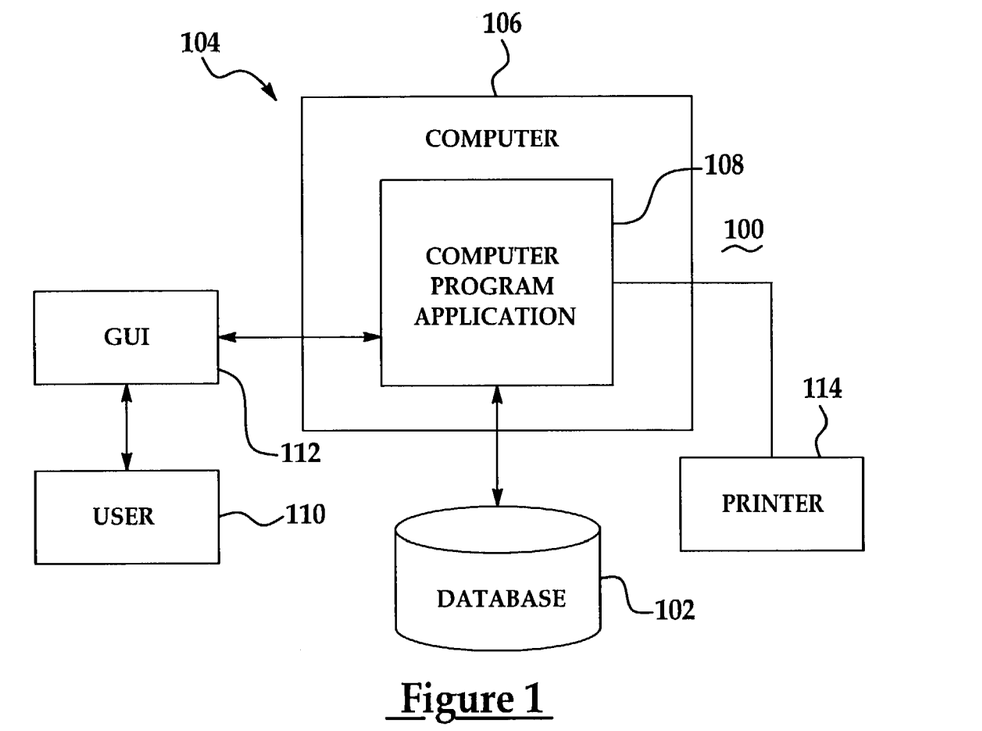
FIG. 1 is a block diagram of a system for determining packaging for a part, according to an embodiment of the present invention.

With particular reference to FIG. 1, the system 100 includes the database 102 and a processing unit 104. In one embodiment of the present invention, the processing unit 104 is embodied in a computer 106 and a computer program application 108 running on the computer. The user 110 interacts with the computer program application 108 through a graphical user interface or "GUI" 112. Furthermore in another embodiment, the system 100 may include a plurality of computers 106 which are connected into a network. Specified computers or users on the network having access to the system and methods of the present invention.

In one embodiment, the system 100 may include a printer 114 which allows PWOs and other data to printed on paper. Alternatively, the printer 114 may be separate from the system 100.

In one aspect of the present invention, the database 102 has stored thereon package specification data. The processing unit 104 is adapted to establish a set of part characteristics and to determine a packaging specification for the part as a function of the part characteristics and the package specification data. In one embodiment of the present invention, the set of part characteristics are established by the user 110 (see below) and includes a part identification, such as a part number. The part identification may also include a part type identification, a type of packaging, and a language for the specification, e.g., English. In one embodiment, the set of part characteristics are input by the user 110. In another embodiment, the set of part characteristics are retrieved from other sources.

In one aspect of the present invention, the processing unit 104 is adapted to list one or more potential PWOs. In other words, there may be more than one PWO defined for a particular part. The potential PWOs are listed, allowing the user 110 to select the desired or most appropriate PWO.

In one aspect of the present invention, the potential part specifications are identified by at least one of the part identification, a country code, a record type, a supplier code, and a supplier name. In another aspect of the present invention, one of the potential part specifications is identified as a preferred specification.

Figure 2:
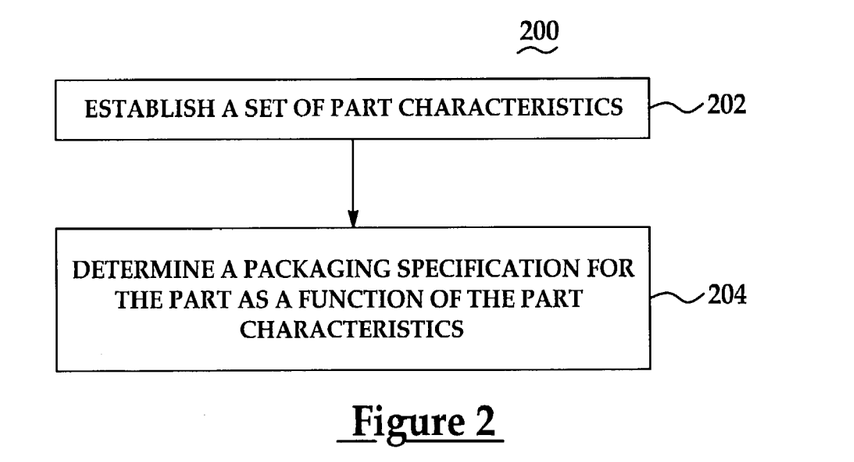
FIG. 2 is a flow diagram of a method for determining packaging for a part, according to an aspect of the present invention.

With specific reference to FIG. 2, the method 200 for determining packaging for a part will now be discussed. In a first process block 202 a set of part characteristics is established. In a second process block 204, a packaging specification is determined for the part as a function of the part characteristics.

In one aspect of the present invention, the packaging specification is also determined as a function of other predetermined package specifications, e.g., the definitions of available packaging materials and containers.

In one embodiment, the predetermined package specifications are contained in written materials, such as binders, worksheets and the like. In this embodiment, the method 200 is performed manually.

In other embodiment, the predetermined package specifications are contained in one or more package specification databases located within one or more computer systems. In this embodiment, the method 200 may be performed either manually or automatically using the system 100 (see above). If performed manually, the databases are used as reference tools (in the same manner as the written materials described above).

In one embodiment of the present invention, the set of part characteristics are established by the user 110 and includes a part identification. The user 100 may establish the set of part characteristics by inputting the part characteristics or retrieving the characteristics from other sources (or a combination of both). The part characteristics may be determined as a function of the part identification and a parts characteristics database (based on the part identification).

In one embodiment of the present invention, the set of part characteristics are input by the user 110 (see below) and includes a part identification, such as a part number. The part identification may include a part type identification, a type of packaging, and a language for the specification, e.g., English.

In one aspect of the present invention, the processing unit 104 is adapted to list one or more potential PWOs. In other words, there may be more than one PWO defined for a particular part,. The potential PWOs are listed, allowing the user 110 to select the desired or most appropriate PWO.

In one aspect of the present invention, the potential part specifications are identified by at least one of the part identification, a country code, a record type, a supplier code, and a supplier name. In another aspect of the present invention, one of the potential part specifications is identified as a preferred specification.

Figure 3:
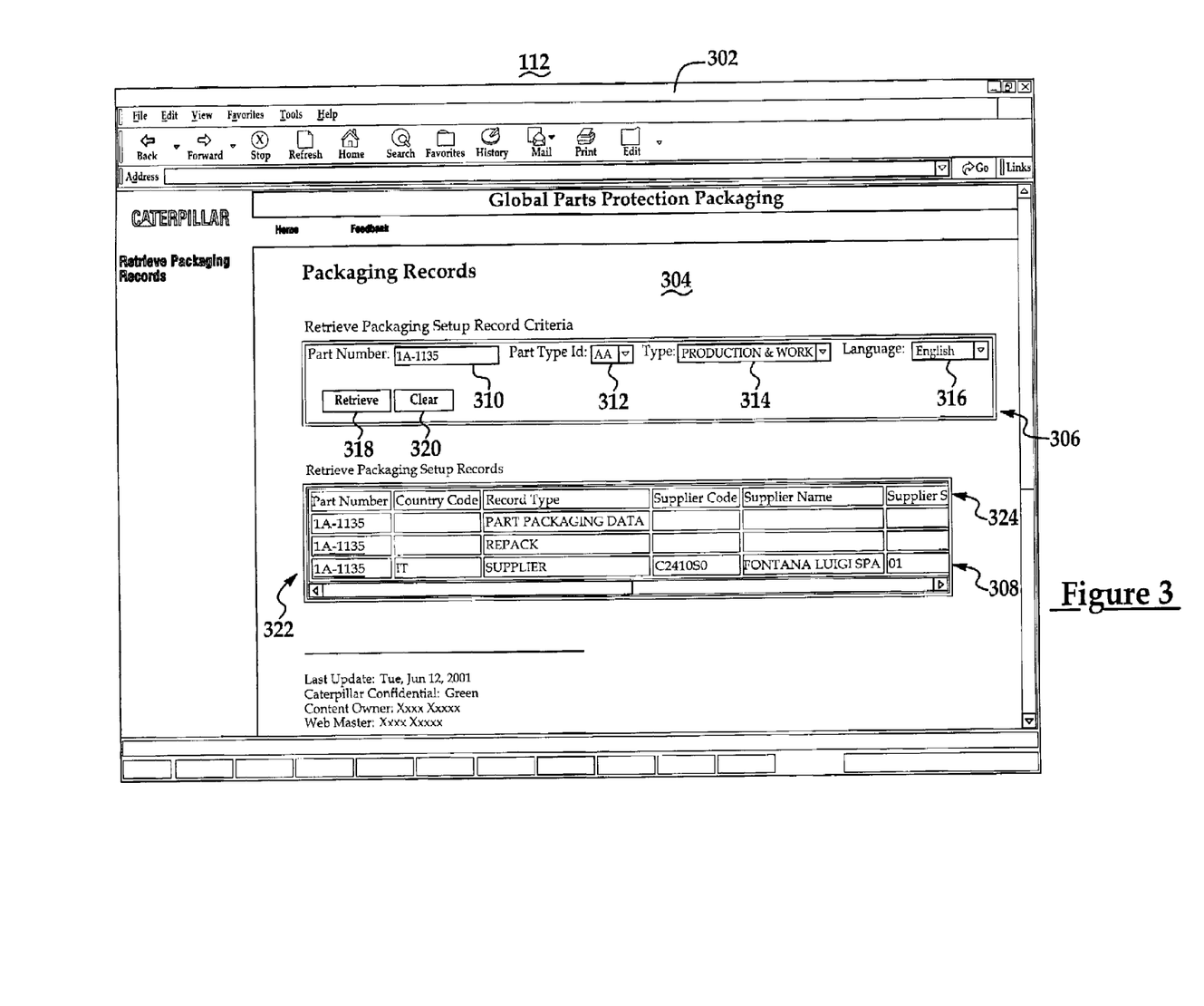
FIG. 3 is a diagrammatic illustration of a graphical user interface used with the method of FIG. 2, according to an embodiment of the present invention.

With specific reference to FIG. 3, a portion 302 of an exemplary graphical user interface 112 illustrated. In the illustrated embodiment, the GUI 112 may be provided at a computer 106 remote from the database. The GUI 112 may also be provided local to the database. The computer 106 is connected into a network, such as the Internet, and the GUI is executed via a world-wide web browser, such as Microsoft Internet Explorer, available from Microsoft of Redmond, Wash.

The GUI portion 302 includes a web page 304 having a criteria section 306 and a records section 308. The criteria section 306 allows the user 110 to enter part identification information regarding the part for which the user 110 is interested in seeing the records. In the illustrated embodiment, the criteria section 306 includes a part number input box 310, a part type identification drop down list 312,a type drop down list 314, and a language drop down list 316.

The part number is a unique number which identifies one specific part. The part type identifier is used to classify part numbers. The part type identifier always accompanies the part number and is used to distinguish differences in parts, e.g., between a service part or literature.

The type identifier is used to classify PWOs, e.g., PWOs could be classified as "PRODUCTION", "WORK" (in progress), or "PAST". The language drop down list 316 allows the user 110 to select the language for the PWO. The criteria section 306 also includes a retrieve button 318 and a clear button 320. After the user 110 enters the information describing the current part in the input box 310 and the drop down lists 312, 314, 316, actuation of the retrieve button 318 causes the matching PWOs to be found and displayed to the user 110 in the records portion 308. Actuation of the clear button 320 clears the criteria portion.

It should be noted that the user 110 does not have to enter or select information in the input box and the drop down lists 312,314,316. However, the search will return all PWOs or records which match the input information. For example, if only a part type is selected in the part type drop down list 312, then all PWOs associated with all parts classified by that part type are returned.

In the illustrated embodiment, the records portions 308 is divided in a plurality of rows 322 and columns 324, as shown. Each row 322 relates to a PWO. The columns 324 describe the fields for each PWO. In the illustrated embodiment, the fields displayed for each PWO include, but are not limited to, the part number, a country code, a record type, a supplier code and a supplier name (where appropriate). The country code identifies the country in which the part was produced. The record type is another way in which the records or PWOs are classified. In one embodiment, the record type is one of the following types:

"PART PACKAGING DATE"—defined as information inherent to the part;

"REPACK"—defined as packing specifications for internal processing of parts or for processing at a local contract processor; and "SUPPLIER"—defined as specific packaging related instructions for suppliers.

Columns may also be provided for a supplier status (not shown) and indicating a preferred PWO (not shown).

In one embodiment, the supplier code is one of three values:

"01"—the supplier does not packaging;
"02"—the supplier packages all parts; and,
"03"—the supplier packages some parts.

There may be more than one preferred PWO. This is most likely to occur when the part is sourced at more than one supplier.

Figure 4:
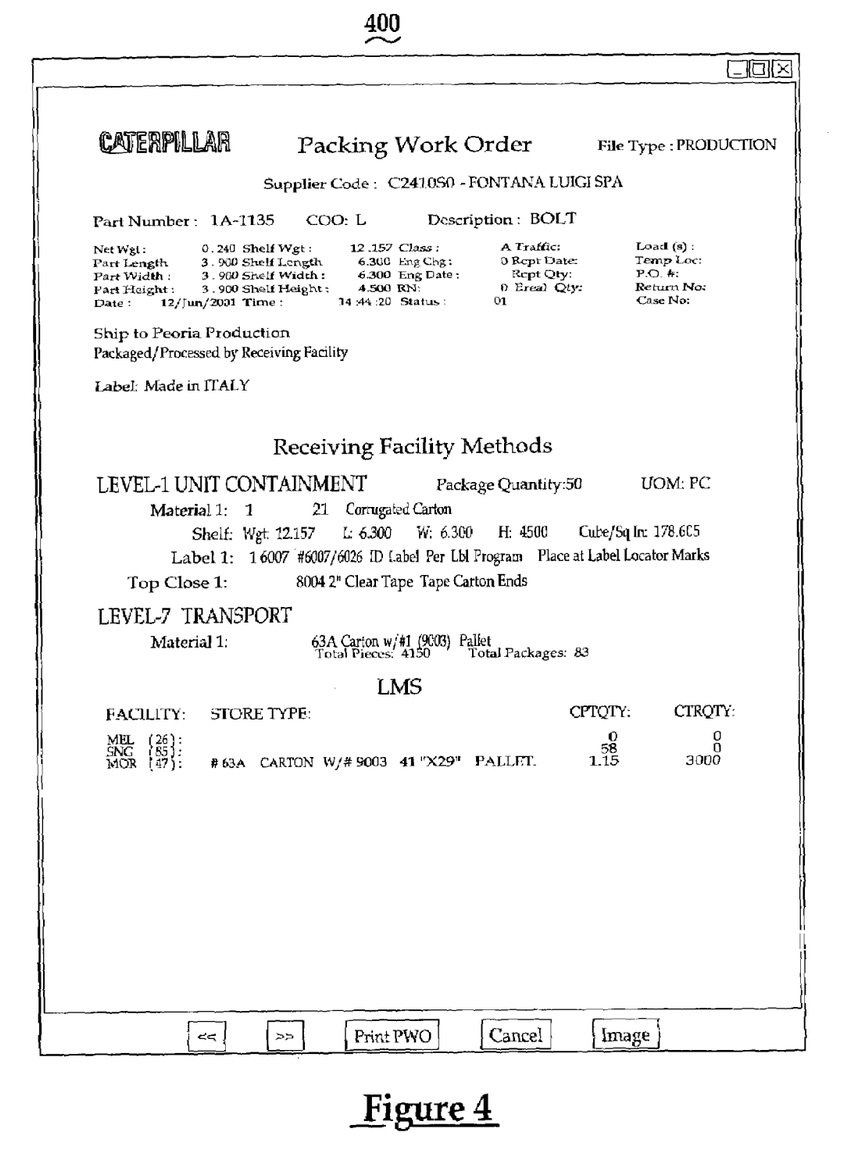
FIG. 4 is a diagrammatic illustration of an exemplary packaging work order generated by the present invention.

Each record or PWO is hyperlinked, i.e., selection of the link returns the PWO. A sample PWO 400 is shown in FIG. 4.

In one embodiment, there are five (5) levels of packaging and a packaging recommendation may include packaging instructions for one or more levels. The levels may be defined as indicated below:

Level 1 Unit Containment is the first "overpack" that is applied to the part, e.g., one part in a poly bag, and is sold in this quantity.

Level 2 Unit Containment is the second level of "overpack" that is applied to the Level 1 packaging, e.g., 10 poly bags in a paperboard cartin, and is sold in this quantity.

Level 3 Unit Containment is the third level of "overpack" that is applied to the level 2 packaging, e.g., 5 paperboard cartons in a corrugated carton, and is sold in this quantity.

Level 5 Unit Containment is a second, third, or fourth level of "overpack" applied to the level 1, 2 or 3 packaging, e.g., 10 poly bags in a paperboard carton, but is only used to move material efficiently between facility. It is not sold in this quantity, but only moved (referred to as the material handling quantity).

Level 7 Transport is a generic transportation containment that is set to move parts from facility to facility.

Returning to FIG. 1, in another aspect of the present invention, the computer based system 100 is used to create the packaging for a part by assigning packaging materials and methods to the part. A plurality of packaging materials, a plurality of packaging methods, and a plurality of packaging statements may be stored on the database 102.

The computer program application 106 is used to add, remove, and modify packaging materials, methods, and statements and to create the PWOs for specific part numbers of part types. The part type is used to group a number of parts and may be used to identify the company to which a part is associated.

In one embodiment, the processing unit 104 is adapted to establish a set of part characteristics related to the part, associate at least one package from the database with the part, and associate at least one packaging method from the database with the part, and to define a packaging specification for the part as a function of the part characteristics, the at least one packaging material, and the at least one packaging method. In the one embodiment, the user 110 enters information related to the part or part type for which a PWO is being created. Then (as described below), the user 110 assigns packaging materials, methods, and statements to the part or part type which are to be included on the PWO.

In one embodiment, the plurality of packaging materials are defined by type of packaging, size (dimensional data), and material. For example, the type of packaging could be a box or envelope. Other types of packaging include, but are not limited to, cartons, pads, bookfolds, stay flat mailers, sleeves, frames, vacuum/shrink packs, shrink wraps, blister packs, wood boxes, crates, poly or VCI bags, paper backed bags, poly faced bags, boards, corrugated boards, or skid containers. The size of a box, e.g., includes interior dimensions, weight, natural rest dimensions, wood dimensions, and shelf dimensions (exterior dimensions). Materials include corrugated cardboard, paperboard, etc. . .

In one embodiment, the plurality of materials are defined by a user type. For example, the user type is selected from a list consisting of universal user, supplier, remanufacturer, and identified (named) supplier.

In one embodiment, the plurality of materials includes an image or drawing which illustrates the arrangement of parts relative to the package.

In one embodiment, the packaging materials also include one or more of the following: a part type identification, an effective date in, an effective date out, a part type.

The packaging methods are instructions and generally relate to one or more of the packaging materials. The packaging methods may be related to other things as well, for example, the placement of material statements and/or caution statements.

In one embodiment, the packaging method includes one or more of the following: a method identifier, at least one class description (e.g., a major class description and a minor class description), a priority code, method instructions, a user type (e.g., universal, supplier, and identified supplier).

The method may use a classification structure to help define packaging material/methods into an orderly structure. In one embodiment the classification structure may include a major class and a minor class.

Figure 5:
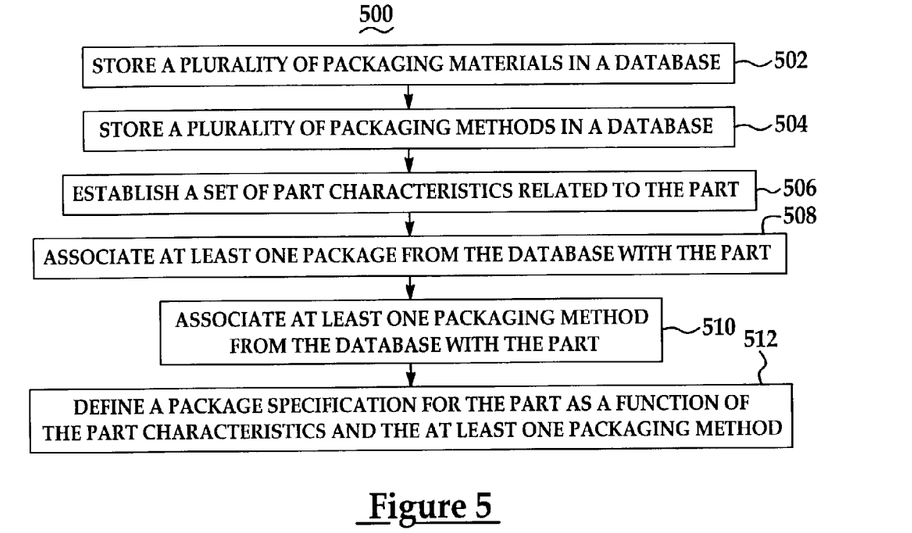
FIG. 5 is a flow diagram of a method for determining packaging for a part, according to another aspect of the present invention.

With reference to FIG. 5, a method 500 for preparing packaging for a part, according to a fourth aspect of the present invention will now be discussed. In a first process block 502, a plurality of packaging materials are stored in the database 102. In a second process block 504, a plurality of packaging methods are stored in the database 102. In a third process block 506, a set of part characteristics related to the part are established.

In a fourth process block 508, at least one packaging material from the database 102 with the part is associated with the part. In a fifth process block 510, at least one packaging method from the database 102 is associated with the part. In a sixth processing block 512, a packaging specification for the part is defined as a function of the part characteristics, the at least one packaging material, and the at least one packaging method.

In another embodiment of the present invention, the method 500 further includes the steps of storing a plurality of statements in the database 102 and associating at least one statement from the database 102 to the part. The packaging specification is defined as a function of the part characteristics, the at least one packaging material, the at least one packaging method, and the at least one statement.

With reference to FIGS. 6–9, an exemplary portion 602 of the GUI 112 for adding, modifying materials, method, and statements will now be discussed. The portion 602 of the GUI 112 includes a GUI screen 604. The GUI screen 604 includes a materials tab 606, a methods tab 608, a statements tab 610, and a user administration tab 612. As shown discussed below, selection of one of the tabs 606, 608, 610, 612 displays a respective panel to be displayed in the screen 604. The screen 604 also includes a save button 614, a close button 616, a new button 618, a delete button 620, a retrieve button 622, a clear button 624, and a translate button 626. The buttons 614, 616, 618, 620, 622, 624, 626 act on the current record (material, method, statement or user).

Figure 6:
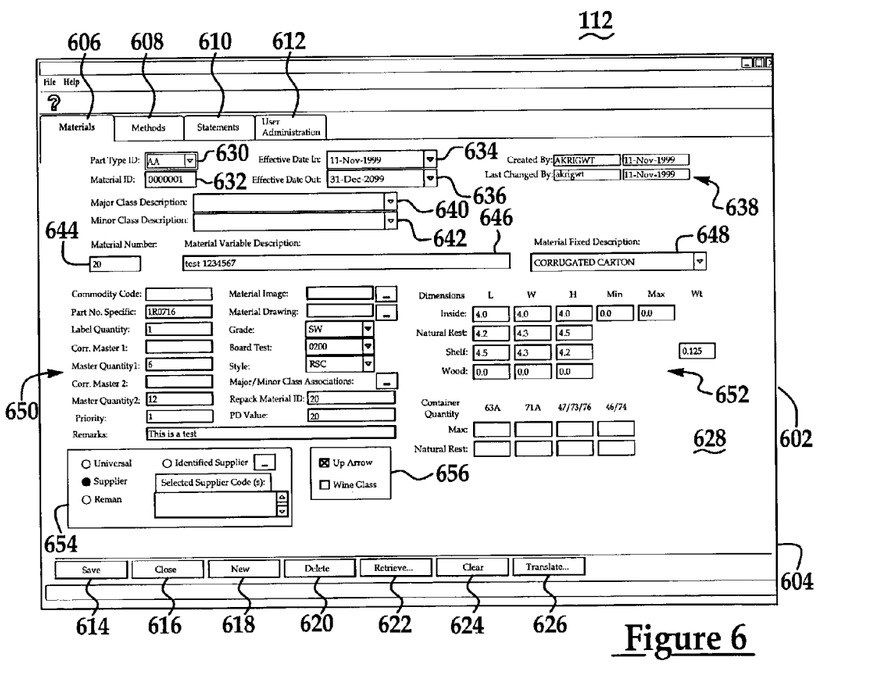
FIG. 6 is a diagrammatic illustration of a first portion of a graphical user interface used with the method of FIG. 3.

With specific reference to FIG. 6, selection of the materials tab 606 displays a materials panel 628 in the screen 604. The materials panel 618 is used to enter and modify packaging materials into the database 102 and to associate the packaging materials with part types.

The materials panel 628 includes a part type id drop down list 630, a material ID box 632, an effective date in drop down list 634, an effective date out drop down list 636, and an information section 638.

The part type id drop down list 630 allows the user 110 to associate the material with a group of parts. The material ID is displayed in the material id box 632. The user 110 may select an effective date in and an effective date out using the effective date in drop down list 634 and effective date out drop down list 636, respectively. The system 100 automatically tracks which user 110 created and modified a record and the dates. This information is displayed in the information section 638.

The materials panel 628 also includes a major class description drop down list 640, a minor class description drop down list 642, a material number entry box 644, a material variable description text box 646, and a material fixed description drop down list 648. The major class description drop down list 640 and the minor class description drop down list 642 allow the user 110 to select major and minor class descriptions for the material. The material number entry box 644 allows the user 110 to assign a material number to the material. The user 110 may enter a variable description of the material in the material variable description text box 646 and select a material fixed description using the material fixed description drop down list 648.

The materials panel 628 also includes a details section 650 and a dimension/weight section 652. The details section 650 allows the user to include additional information relating to the material, such as, a commodity code,
part no.,
label quantity,
material images and/or drawings,
grade,
style, and,
repack material id.

The dimension/weight section 652 allows the user 110 to enter dimensional and weight data.

The materials panel 628 further includes a user section 654 and a symbol section 656. The user section 654 allows the user 110 to designate who may use the material. In the illustrated embodiment, the user 110 may select "Universal", "Supplier", "Reman", or "Identified Supplier". Selection of Universal means that anyone may use the material. Supplier and Reman means that any supplier or remanufacturer may use the material. Identified Supplier means that only the identified supplier (by supplier code) may use the material. The user 100 may indicate any designations or symbols which are located on the material by checking an appropriate check box in the symbol section.

Figure 7:
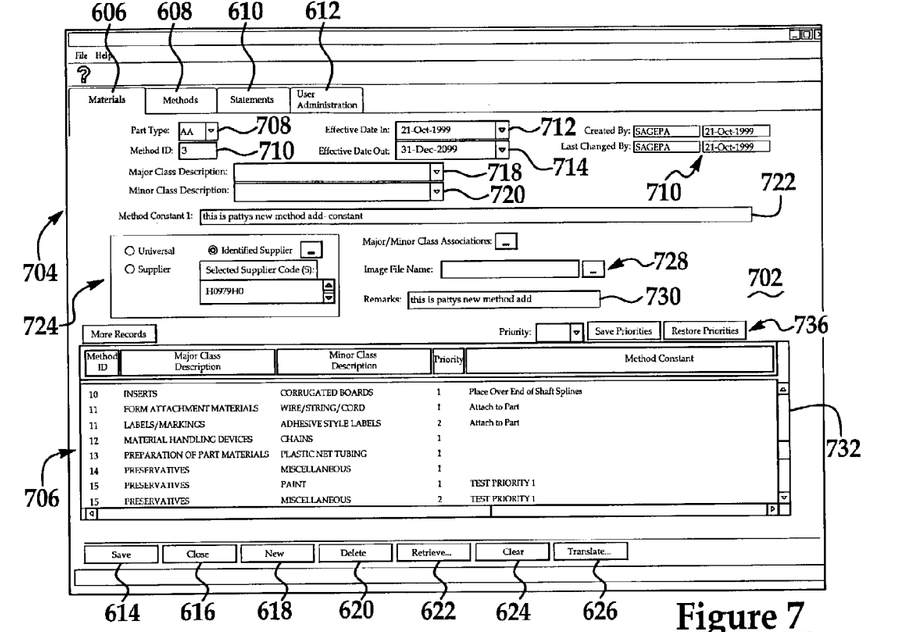
FIG. 7 is a diagrammatic illustration of a second portion of a graphical user interface used with the method of FIG. 3.

With specific reference to FIG. 7, selection of the methods tab 608 displays a methods panel 702. The methods panel 702 is used to add and modify methods in the database 102 and to associate the methods with groups of parts. The methods panel 702 includes a details section 704 and a list section 706.

The details section 704 includes a part type id drop down list 708, a method ID box 710, an effective date in drop down list 712, an effective date out drop down list 714, and an information section 716.

The part type id drop down list 708 allows the user 110 to associate the method with a group of parts. The method ID is displayed in the method id box 710. The user 110 may select an effective date in and an effective date out using the effective date in drop down list 712 and effective date out drop down list 714, respectively. The system 100 automatically tracks which user 110 created and modified a record and the dates. This information is displayed in the information section 716.

The details section 704 also includes a major class description drop down list 718 and a minor class description drop down list 720. The major class description drop down list 718 and the minor class description drop down list 720 allow the user 110 to select major and minor class descriptions for the method. The user 110 may enter text associated with the method in a method constant 1 text box 722.

The details section 704 further includes a user section 724. The user section 724 allows the user 110 to designate who may use the method. In the illustrated embodiment, the user 110 may select "Universal", "Supplier", or "Identified Supplier". Selection of Universal means that anyone may use the method. Supplier and means that any supplier may use the method. Identified Supplier means that only the identified supplier (by supplier code) may use the method. The details section 704 also includes a major/minor class associations button 726, an image file section which enables the user 110 to associate an image file with a method, and a remarks entry text box 730.

The list section 706 includes a list 732 of current methods, a more records button 734, and a priority section 736. The priority section 736 allows priorities to be set for each method.

Figure 8:
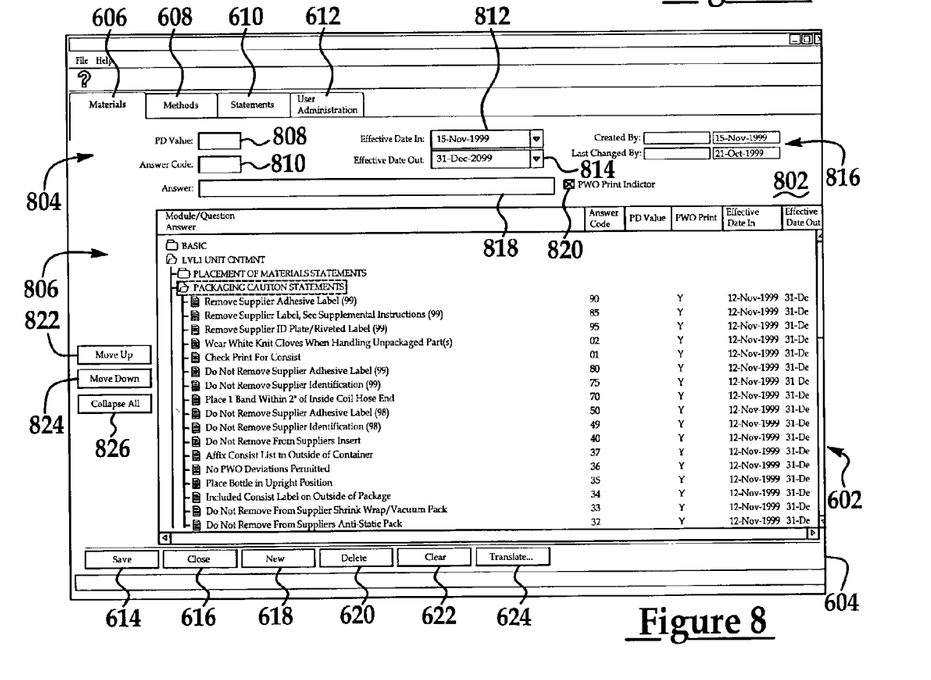
FIG. 8 is a diagrammatic illustration of a third portion of a graphical user interface used with the method of FIG. 3.

With specific reference to FIG. 8, selection of the statements tab 610 displays a statements panel 802. The statements panel 802 is used to add and modify statements in the database 102 and to associate the statements with groups of parts. The methods panel 802 includes a details section 804 and a list section 806.

The details section 802 includes a PD value entry box 808, an answer code entry box 810, an effective date in drop down list 812, an effective date drop down list 814, an information section 816, and an answer text entry box 818. The PD Value may be used to retrieve data from an external system (not shown). The user 110 enters information into the details section 804 using the entry boxes 808, 810, 818 and the drop down lists 812, 814. The answer includes an answer code and a corresponding statement. The statement is printed on the specification as a written message. A check box 820 indicates whether the current statement is to be printed on the PWO.

The list section 806 includes a move up button 822, a move down button 824, a collapse all button 826, and a list 828. The list 828 lists all current statements in the database 102. The list are organized in folder based on their intended use. In the illustrated embodiment, the statements are organized in a basic folder and a series of level containment folders. The buttons 822, 824, 826 are used to manipulate the statements within the folders. Within each folder, the statements are organized in subfolders based on their intended use, e.g., statements regarding the placement of materials statements or packaging caution statements.

Figure 9:
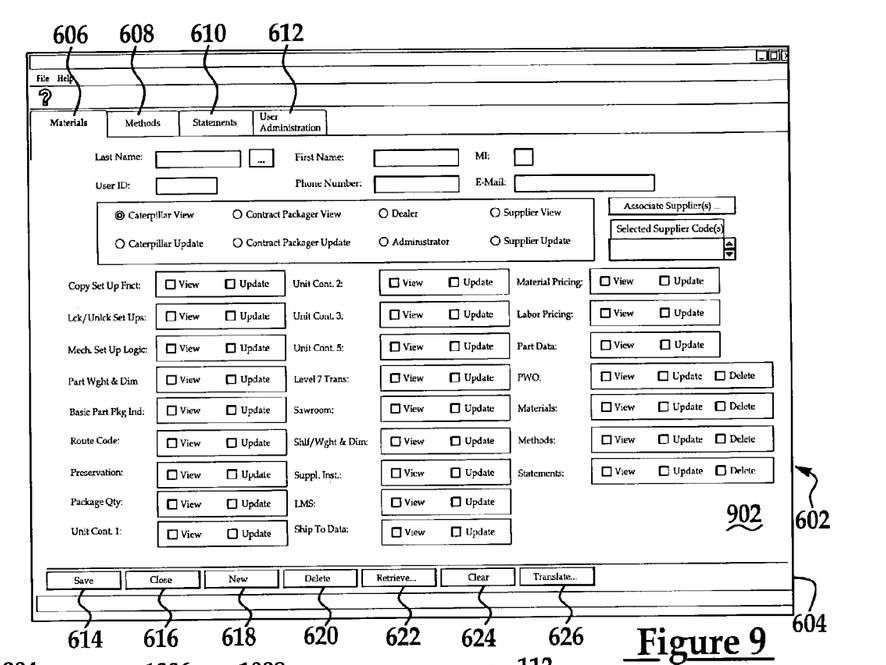
FIG. 9 is a diagrammatic illustration of a fourth portion of a graphical user interface used with the method of FIG. 3.

With specific reference to FIG. 9, selection of the user administration tab 612 displays a user administration panel 902 to be displayed. The user administration panel 902 allows user rights to be added or modified for individual users of the system 100.

With specific reference to FIGS. 10–14, a third portion 1002 of the GUI 112 is used to associate packaging materials, methods, and statements to a part, i.e., to define the components of the PWO for a particular part. The third portion 1002 of the GUI 112 includes a retrieve package records tab 1004, a packaging data tab 1006, and a part data inquiry tab 1008.

Figure 10:
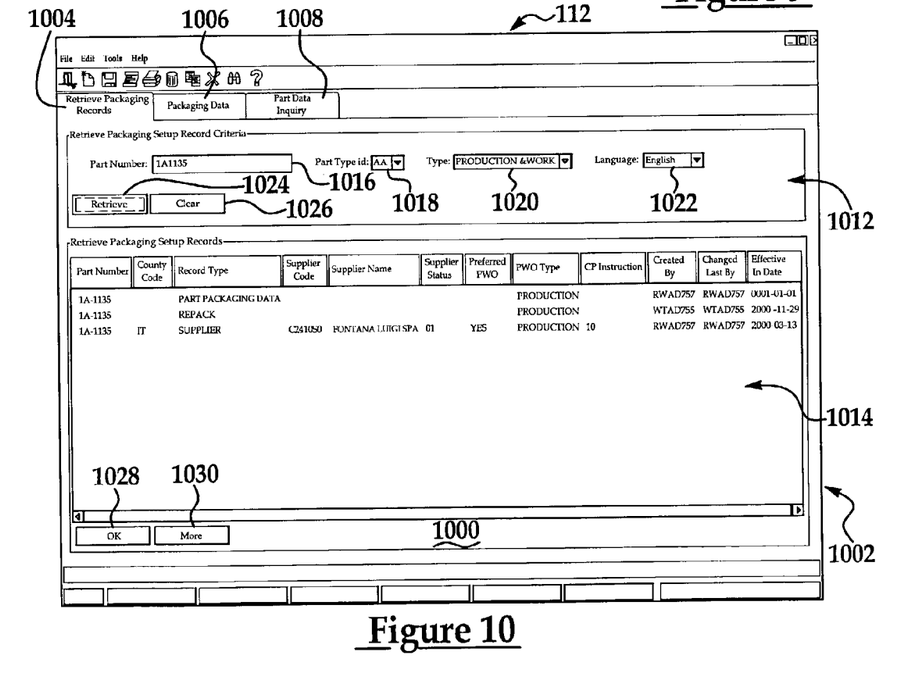
FIG. 10 is a diagrammatic illustration of a fifth portion of a graphical user interface, according to an embodiment of the present invention.

Selection of the retrieve packaging records tab 1004 displays a retrieve records panel 1010. The retrieve records panel 1010 includes a criteria section 1012 and a list section 1014.

The criteria section 1012 includes a part number entry box 1016, a part type id drop down list 1018, a type drop down list 1020, a language drop down list 1022, a retrieve button 1024, and clear button 1026. The criteria section 1012 is used to identify the part for which a PWO is to be created or modified. Once the user 112 has identified the part via the entry box 1016 and the drop down lists 1018, 1020, 1022, selection of the retrieve button 1024 lists all available records in the list section 1014. To select a record to modify, the records is simply selected in the list 1014 and an ok button 1028 is selected. A more button 1030 is used to display additional records.

Figure 11:
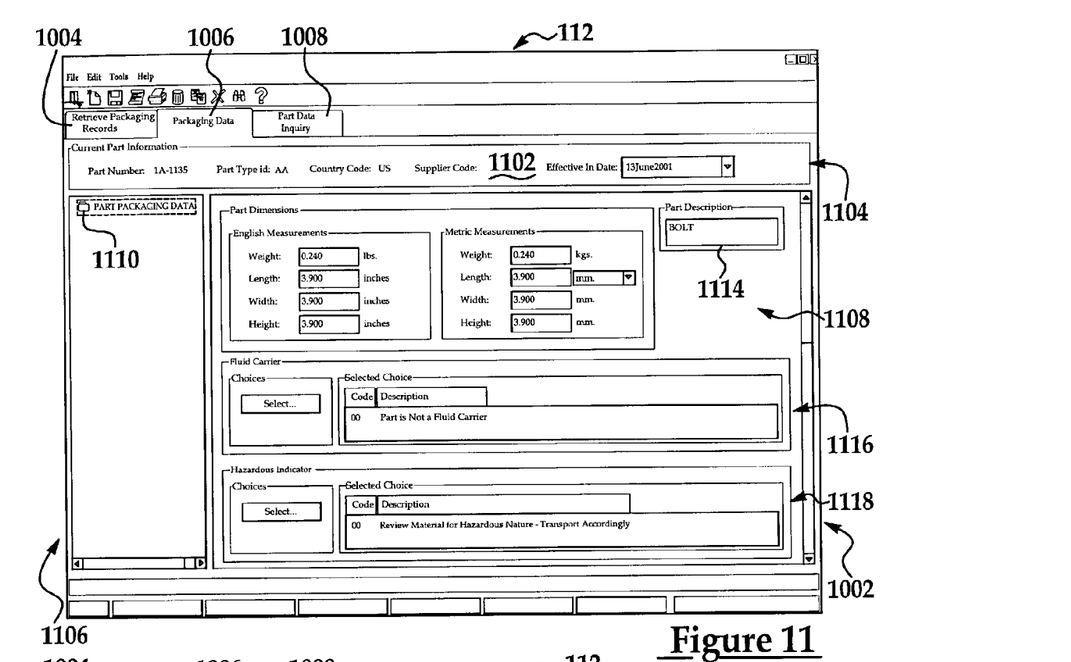
FIG. 11 is a diagrammatic illustration of a sixth portion of a graphical user interface, according to an embodiment of the present invention.

With specific reference to FIG. 11, once the part or record has been found, selection of the packaging data tab 1006 displays a packaging data panel 1102. In the illustrated embodiment, the packaging data panel 1102 includes a current part information section 1104, a list 1106 and an information section 1108.

The information section 1104 identifies the current part and allows the user to select an effective in date.

The list section 1106 is organized into folders. Each folder includes items to which materials, statements, and/or methods may be added. Selection of in item within the list 1106 will dictate the elements of the information section 1108.

For example, with selection of a packaging data folder 1110 in the list 1106, the information section 1108 includes a dimension section 1112, a part description entry box 1114, a fluid carrier section 1116, and a hazardous indicator section 1118. The user 110 enters or modifies information relating to the part in the dimension section 1112 and the part description entry box 1114. The fluid carrier section 1116 and the hazardous indicator section 1118 are used to associate statements or methods with the part for inclusion on the PWO.

The packaging data panel 1102 may also include an outside storage indicator, a special handling indicator, an asbestos indicator, and a packaging and process control indicator (not shown).

Figure 12:
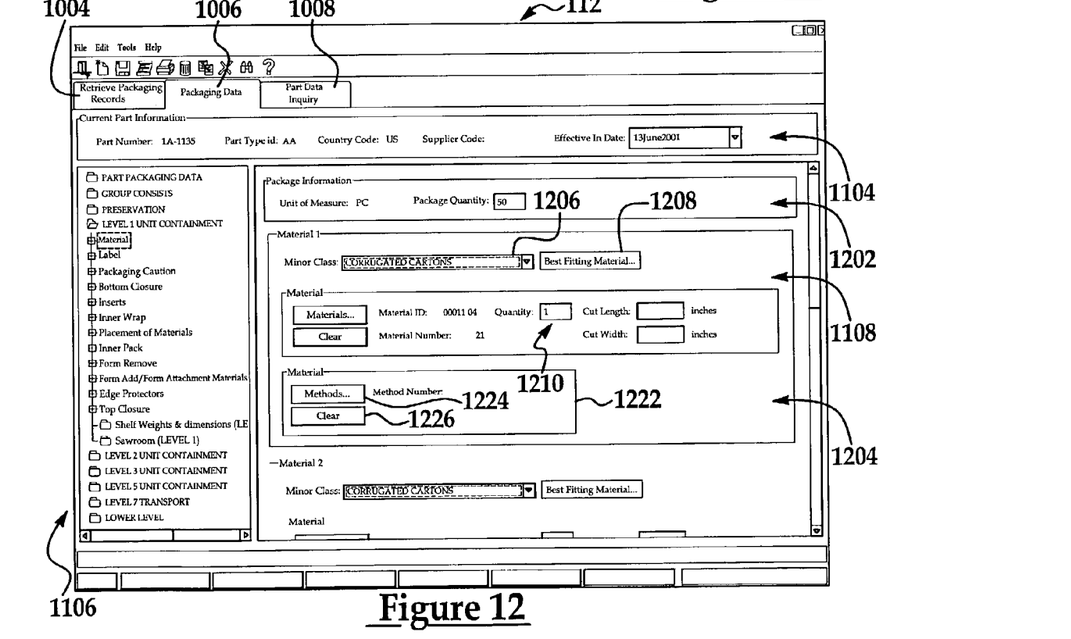
FIG. 12 is a diagrammatic illustration of a seventh portion of a graphical user interface, according to an embodiment of the present invention.

With specific reference to FIG. 12, the list 1106 includes folders for each level of containment. Within each level of containment are items relating to different types of packaging, e.g., material, labels, cautions, inserts, etc. . . . For example, as shown in FIG. 12, the item "material" allows the association of multiple packaging materials (in the database 102) to be associated with the part.

With the material item selected in the list, the information section 1108 includes a package information section 1202 and at least one material section 1204. The package information section 1202 allows the user 110 to enter information relating the part to the selected package, e.g., the number of parts within a carton.

Multiple materials are allowed to be associated with the part. The material section 1204 includes a minor class drop down list 1206, a best fitting material button 1208, a material selection section 1210. The minor class drop down list 1206 allows the user 110 to select the class of possible materials. Use of the best fitting material button will be discussed below.

The material selection section 1210 allows the user 110 to select the packaging material from the materials contained in the database 102, to select the quantity of the packaging material, and enter other dimensional data where appropriate.

The information section 1108 also include a method selection section 1222 which allows the user 110 to select method associated with the packaging material selected in the material selection section 1210. The method selection section includes a methods button 1224 and a clear button 1226. Activation of the methods button 1224 allows the user 110 to select a method from a list generated from the database 102.

Figure 13:
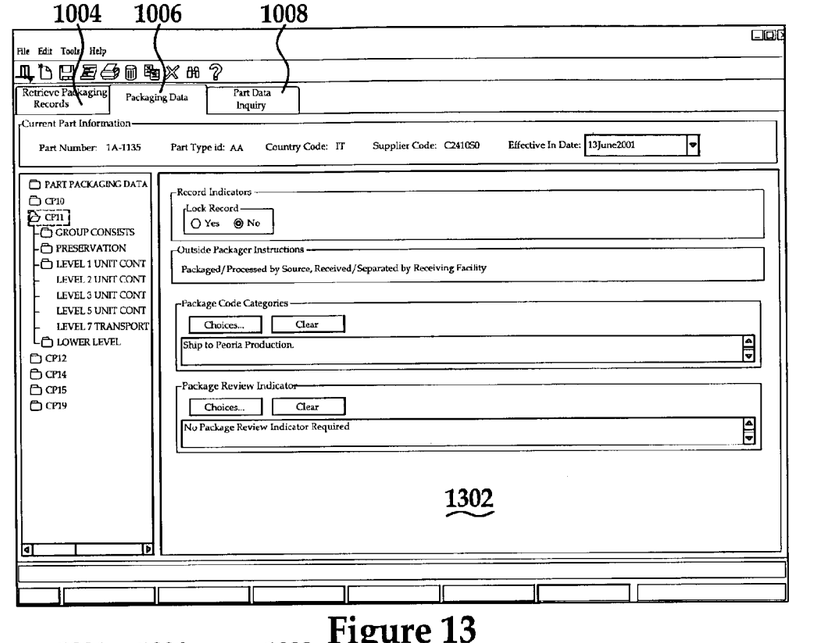
FIG. 13 is a diagrammatic illustration of an eighth portion of a graphical user interface, according to an embodiment of the present invention.

With reference to FIG. 13, a supplier packaging activities screen 1302 is illustrated in the packaging data panel 1102. The supplier packaging activities screen 1302 is used to indicated the activities for which the supplier is responsible. In one embodiment, the following codes may be used:

CP1O—supplier performs no packaging, a contract packager performs all packaging.
CP11—supplier performs all packaging.
CP12—supplier partial packs, contract packager does the rest.
CP14—supplier preserves the part, and the contract packager does the packaging.
CP15—supplier packages the part, the contract packager does the labels.
CP19—supplier performs all packaging and direct ships to dealer/customer.

Figure 14:
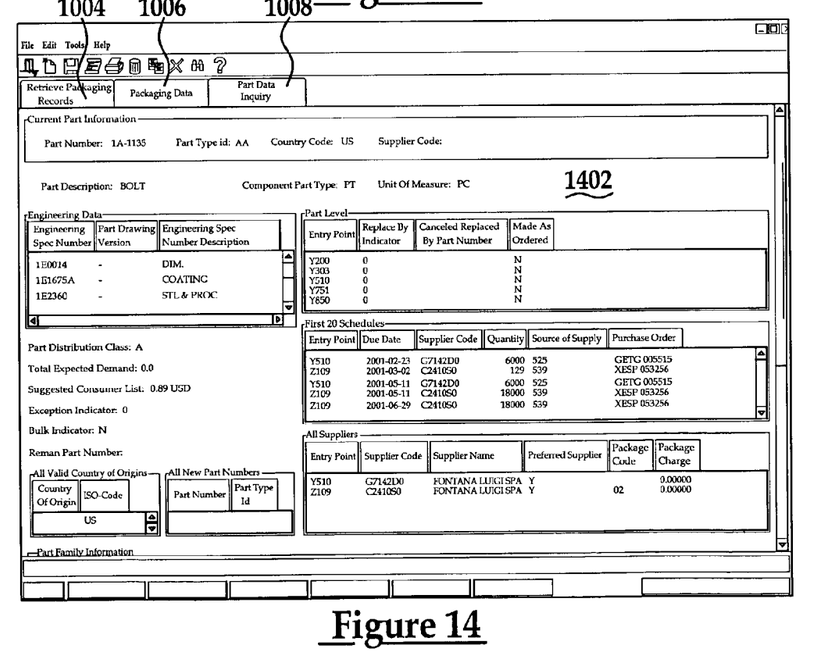
FIG. 14 is a diagrammatic illustration of a fourth portion of a graphical user interface, according to an embodiment of the present invention.

With reference to FIG. 14, selection of the part data inquiry tab 1008 displays a part level data screen 1402. The part level data screen 1402 gives the user 110 access to a number of resources which allows the user to make the best packaging decision. In one embodiment, the following resources are available:
- engineering specifications;
- serviceability data;
- demand data;
- supplier data;
- remanufacture data;
- purchasing schedules/quantities;
- part facility data; and,
- pricing information.

In another aspect of the present invention, a computer based method for determining packaging for a part is provided. The method includes the steps of establishing a set of part characteristics and dynamically determining at least one recommended package as a function of the part characteristics and a package database. In one embodiment, the step of dynamically determining at least one recommended package uses a best-fit algorithm. For example, the best-fit algorithm includes the step of comparing dimensions (length, width, height, and/or volume) of the part with dimensions of the package. In one embodiment, the part characteristics includes shipping characteristics, e.g., distance, method of travel, exposure and/or cost of materials.

Figure 15:
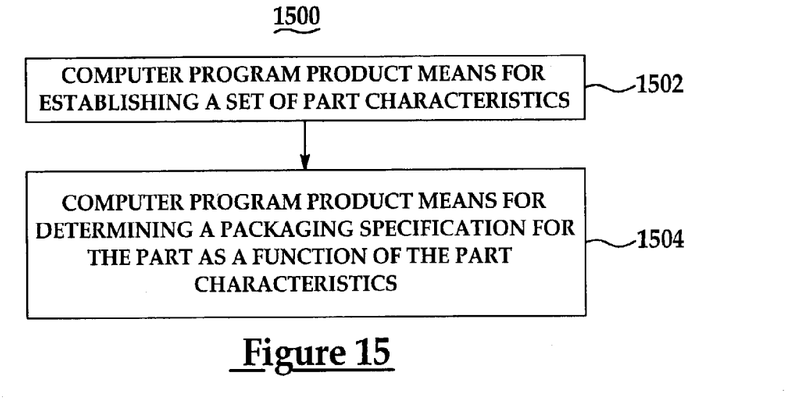
FIG. 15 is a block diagram of a computer program product for determining packaging for a part, according to an aspect of the present invention; and, FIG. 16 is a block diagram of a computer program product for determining packaging for a part, according to another aspect of the present invention.

In a fifth aspect of the present invention, with reference to FIG. 15 a computer program product 1500 prepares packaging for a part. The computer program product 1500 includes computer readable program code means 1502 means for establishing a set of part characteristics and computer readable program code means 1504 for determining a packaging specification for the part as a function of the part characteristics and a package specification database.

Figure 16:
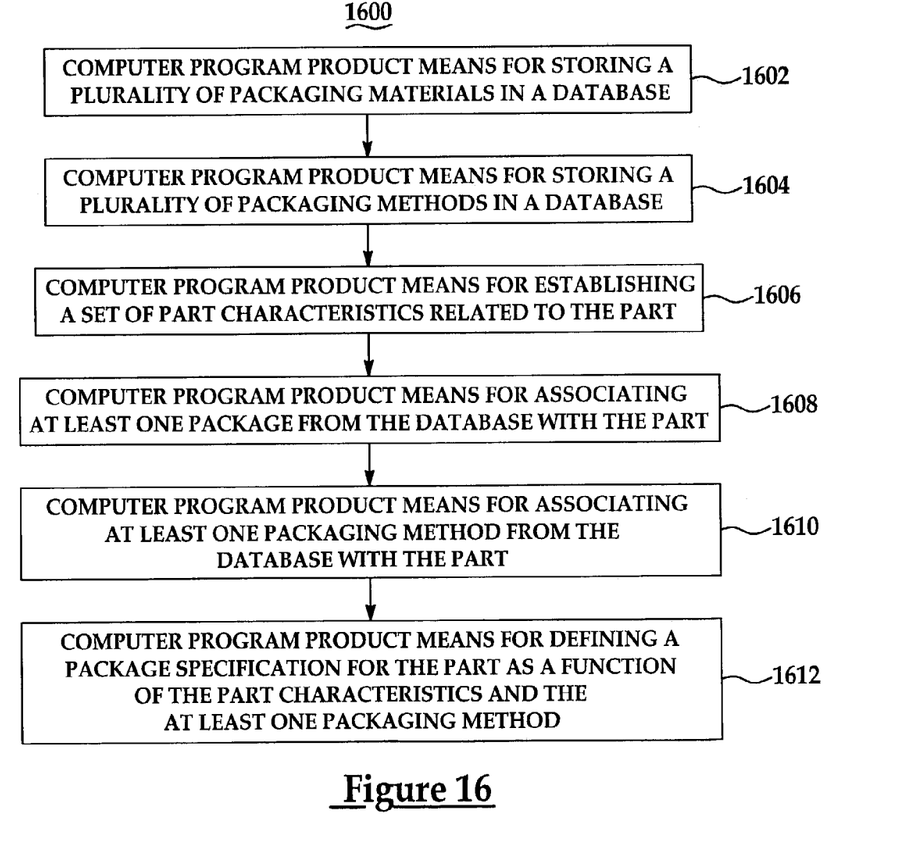

In a sixth aspect of the present invention, with reference to FIG. 16 a computer program product 1600 prepares packaging for a part. The computer program product 1600 includes computer readable program code means 1602 for storing a plurality of packaging materials in a database, computer readable program code means 1604 for storing a plurality of packaging methods in the database, and computer readable program code means 1606 for establishing a set of part characteristics related to the part. The computer program product 1600 further includes computer readable program code means 1608 for associating at least one packaging material from the database with the part, computer readable program code means 1610 for associating at least one packaging method from the database with the part, and computer readable program code means 1612 for defining a packaging specification for the part as a function of the part characteristics, the at least one packaging material, and the at least one packaging method.

INDUSTRIAL APPLICABILITY

With reference to the drawings and in operation, the present invention provides a system 100 method 200, 500 for determining packaging specifications for parts. The system 100 and method 200, 500 have two components. The first component, embodied in the first, second, and fifth aspects of the invention discussed above, allow the user 110 to enter information identifying a part of a group of parts. The system 100, method 200, and computer program product 1500 then display to the user 110 a list of matches or matching packaging specifications (embodied in a packaging work order or "PWO"). The user 110 may pick or select a PWO for viewing and/or printing. In these aspects of the present invention, the user 110 is generally involved in the shipping of parts, i.e., a supplier or internal shipper.

The second component of the present invention, as embodied in the second, fourth and sixth aspect of the present invention, as discussed above, allows the user 110 to add, modify, or remove packaging materials, methods, and statements from the database 102. The user 110 is also allowed to associate packaging materials, methods, and statements from the database 102 with a part of group of parts. The associated packaging materials, methods, and statements are the components which comprise the PWO for that part or group of parts. The user 110 for the second component is typically someone authorized to add, modify, or remove packaging materials, methods, and statements from the database and to create the PWO.

Other aspect and features of the present invention can be obtained from a study of the drawings, the disclosure, and the appended claims.

What is claimed is:

1. A computer based system for determining packaging requirements for at least one individual part, comprising:
   a database for storing package specification data; and,
   a processing unit coupled to the database and being adapted to establish a set of part characteristics associated with the individual part and to determine packaging requirements for the at least one individual part as a function of the part characteristics and the package specification data.

2. A computer based system, as set forth in claim 1, wherein the processing unit is further adapted to establish a part identification and determine the part characteristics as a function of the part identification and a parts characteristics database.

3. A computer based system, as set forth in claim 2, wherein the part identification includes a part number.

4. A computer based system, as set forth in claim 2, wherein the part identification includes a part type identification.

5. A computer based system, as set forth in claim 2, wherein the part identification is input by a user.

6. A computer based system, as set forth in claim 5, wherein the processing unit is further adapted to determine a list of potential part specifications.

7. A computer based system, as set forth in claim 6, wherein the processing unit is adapted to provide the list to the user and allow the user to select one of the potential part specifications.

8. A computer based system, as set forth in claim 6, wherein the potential part specifications are identified by at least one of the part identification, a country code, a record type, a supplier code, and a supplier name.

9. A computer based system, as set forth in claim 6, wherein one of the potential individual part specifications is identified as a preferred specification.

10. A computer based system, as set forth in claim 1, wherein the part characteristics include a language for the part specification.

11. A computer based system, as set forth in claim 1, wherein the at least one individual part includes a plurality of different individual parts.

12. A method for preparing packaging requirements for at least one an individual part, including the steps of:
   storing a plurality of packaging materials in a database;
   storing a plurality of packaging methods in the database;
   establishing a set of part characteristics related to the individual part;
   associating at least one packaging material from the database with the individual part;

associating at least one packaging method from the database with the individual part; and, defining packaging requirements for the at least one individual part as a function of the part characteristics, the at least one packaging material, and the at least one packaging method.

13. A method, as set forth in claim 12, including the steps of:

storing a plurality of statements in the database; and, associating at least one statement from the database to the part, wherein the packaging requirement is defined as a function of the part characteristics, the at least one packaging material, the at least one packaging method, and the at least one statement.

14. A method, as set forth in claim 13, wherein at least one of the statements is related to placement of material statements.

15. A method, as set forth in claim 13, wherein at least one of the statements is related to caution statements.

16. A method, as set forth in claim 12, including the step of providing a graphical user interface.

17. A method, as set forth in claim 16, wherein the graphical user interface includes a material panel, a methods panel, and a statements panel.

18. A method, as set forth in claim 12, including the step of defining the plurality of packaging materials by type, size, and material.

19. A method, as set forth in claim 12, including the step of associating the plurality of packaging materials by a user type.

20. A method, as set forth in claim 19, wherein the user type is one of universal, supplier, remanufacturer, and identified supplier.

21. A method, as set forth in claim 12, including the step of associating dimensional data with the plurality of packaging materials.

22. A method, as set forth in claim 21, wherein the dimensional data includes inside dimensions, natural rest dimensions, shelf dimensions, and wood dimensions.

23. A method, as set forth in claim 12, including the step of associating a weight with the plurality of packaging materials.

24. A method, as set forth in claim 12, including the step of associating an image with the plurality of packaging materials.

25. A method, as set forth in claim 12, including the step of associating a drawing with the plurality of packaging materials.

26. A method, as set forth in claim 12, including the step of associating a part type identification with each of the plurality of packaging materials.

27. A method, as set forth in claim 12, including the step of identifying at least one of an effective date in and an effective date out associated with each of the packaging materials.

28. A method, as set forth in claim 12, including the step of associating a an part type with each of the packaging methods.

29. A method, as set forth in claim 12, including the step of assigning a method identifier with each packaging method.

30. A method, as set forth in claim 12, including the step of assigning at least one class description to each packaging method.

31. A method, as set forth in claim 12, including the step of assigning a major class description and a minor class description to each packaging method.

32. A method, as set forth in claim 12, including the step of assigning a priority code to each packaging method.

33. A method, as set forth in claim 12, including the step of providing method instructions with each packaging method.

34. A method, as set forth in claim 12, including the step of associating the plurality of packaging methods by a user type.

35. A method, as set forth in claim 34, wherein the user type is one of universal, supplier, and identified supplier.

36. A method, as set forth in claim 12, wherein the at least one individual part includes a plurality of different individual parts.

37. A computer based system for preparing packaging requirements for at least one individual part, comprising:

a database for storing a plurality of packaging materials and a plurality of packaging methods; and, a processing unit coupled to the database and being adapted to establish a set of part characteristics related to the individual part, associate at least one packaging materials from the database with the individual part, and associate at least one packaging method from the database with the individual part, and to define packaging requirements for the at least one individual part as a function of the part characteristics, the at least one packaging material, and the at least one packaging method.

38. A computer based system, as set forth in claim 37, wherein the database includes a plurality of statements in the database and the processing unit is further adapted to associate at least one statement from the database to the part, wherein the packaging requirements are defined as a function of the part characteristics, the at least one packaging material, the at least one packaging method, and the at least one statement.

39. A computer based system, as set forth in claim 38, wherein at least one of the statements is related to placement of material statements.

40. A computer based system, as set forth in claim 38, wherein at least one of the statements is related to caution statements.

41. A computer based system, as set forth in claim 37, including a graphical user interface.

42. A computer based system, as set forth in claim 41, wherein the graphical user interface includes a material panel, a methods panel, and a statements panel.

43. A computer based system, as set forth in claim 37, wherein the plurality of packaging materials are defined by type of packaging, size, and material.

44. A computer based system, as set forth in claim 37, wherein the plurality of packaging materials are defined by a user type.

45. A computer based system, as set forth in claim 44, wherein the user type is one of universal, supplier, remanufacturer, and identified supplier.

46. A computer based system, as set forth in claim 37, wherein the plurality of packaging materials are defined by dimensional data.

47. A computer based system, as set forth in claim 46, wherein the dimensional data includes inside dimensions, natural rest dimensions, shelf dimensions, and wood dimensions.

48. A computer based system, as set forth in claim 37, wherein the plurality of packaging materials are defined by a weight.

49. A computer based system, as set forth in claim 37, wherein the plurality of packaging materials include an image.

50. A computer based system, as set forth in claim 37, wherein the plurality of packaging materials includes a drawing.

51. A computer based system, as set forth in claim 37, wherein the plurality of packaging materials include a part type identification.

52. A computer based system, as set forth in claim 37, wherein the plurality of packaging materials include at least one of an effective date in and an effective date out associated with each of the packaging materials.

53. A computer based system, as set forth in claim 37, wherein each packaging method includes a part type.

54. A computer based system, as set forth in claim 37, wherein each packaging method includes a method identifier.

55. A computer based system, as set forth in claim 37, wherein each packaging method includes at least one class description.

56. A computer based system, as set forth in claim 37, wherein each packaging method includes a major class description and a minor class description.

57. A computer based system, as set forth in claim 37, wherein each packaging method includes a priority code.

58. A computer based system, as set forth in claim 37, wherein each packaging method includes method instructions.

59. A computer based system, as set forth in claim 37, wherein each packaging method includes a user type.

60. A computer based system, as set forth in claim 59, wherein the user type is one of universal, supplier, and identified supplier.

61. A computer based system, as set forth in claim 37, wherein the at least one individual part includes a plurality of different individual parts.

62. A computer program product for determining packaging requirements for at least one individual part, comprising:
    computer readable program code means for establishing a set of part characteristics associated with the individual part; and,
    computer readable program code means for determining packaging requirements for the at least one individual part as a function of the part characteristics and a package specification database.

63. A method, as set forth in claim 62, wherein the step of dynamically determining at least one recommended package takes into account cost of materials.

64. A computer program product, as set forth in claim 62, wherein the at least one individual part includes a plurality of different individual parts.

65. A computer program product for preparing packaging for at least one individual part, comprising:
    computer readable program code means for storing a plurality of packaging materials in a database;
    computer readable program code means for storing a plurality of packaging methods in the database;
    computer readable program code means for establishing a set of part characteristics related to the individual part;
    computer readable program code means for associating at least one packaging material from the database with the individual part;
    computer readable program code means for associating at least one packaging method from the database with the individual part; and,
    computer readable program code means for defining packaging requirements for the at least one individual part as a function of the part characteristics, the at least one packaging material, and the at least one packaging method.

66. A computer program product, as set forth in claim 65, wherein the at least one individual part includes a plurality of different individual parts.

67. A method for determining packaging requirements for at least one individual part, comprising the steps of:
    establishing a set of part characteristics associated with the individual part; and,
    dynamically determining at least one recommended package as a function of the part characteristics and a package database.

68. A method, as set forth in claim 67, wherein the step of dynamically determining at least one recommended package includes the step of performing a best-fit algorithm.

69. A method, as set forth in claim 68, wherein the best-fit algorithm includes the step of comparing dimensions of the part with dimensions of the package.

70. A method, as set forth in claim 65, the part characteristics includes shipping characteristics.

71. A method, as set forth in claim 70, wherein the shipping characteristics includes at least one of distance, method of travel, and exposure.

72. A method, as set forth in claim 67, wherein the at least one individual part includes a plurality of different individual parts.

* * * * *